United States Patent [19]

Toby

[11] 3,852,507
[45] Dec. 3, 1974

[54] SURFACE FREEZING A SHAPED PIECE OF MEAT

[75] Inventor: Daniel J. Toby, South San Francisco, Calif.

[73] Assignee: Toby Enterprises, South San Francisco, Calif.

[22] Filed: May 25, 1972

[21] Appl. No.: 257,020

[52] U.S. Cl. .............................. 426/513, 426/524
[51] Int. Cl. ............................................ A23b 1/06
[58] Field of Search .......... 99/192.2, 193, 194, 195; 100/38, DIG. 10; 62/62–65; 426/524, 512, 513, 516, 517

[56] References Cited
UNITED STATES PATENTS

| | | | |
|---|---|---|---|
| 1,773,080 | 8/1930 | Birdseye | 100/DIG. 10 |
| 1,950,763 | 3/1934 | Walter | 100/38 |
| 2,565,245 | 12/1959 | Lebovitz | 100/38 |
| 2,916,986 | 12/1959 | Lebovitz | 99/192 |
| 3,060,036 | 10/1962 | Van Dolah | 99/194 |
| 3,108,883 | 10/1963 | Goeser | 99/194 |
| 3,242,684 | 3/1966 | Sola | 62/65 |
| 3,728,136 | 4/1973 | Langlands | 100/DIG. 10 |

Primary Examiner—A. Louis Monacell
Assistant Examiner—Martin G. Muller
Attorney, Agent, or Firm—Harris Zimmerman

[57] ABSTRACT

A method for forming an irregular mass of meat into an elongated piece of surface frozen meat having a substantially uniform cross-section configuration. The system includes the placing of said meat mass at a temperature above freezing and at substantially room temperature between a pair of reciprocating die members through which a freezing medium or coolant is circulated. The confronting surfaces of the dies define the desired cross-sectional shape, and as the mass is compressed into desired shape between the opposed die members, the cold dies will also cause the meat to be surface frozen to a depth of about one eighth of an inch. The meat is then removed from the dies and ready for slicing or other operations. Although the term "meat" may be used throughout this specification, it will be understood that such term is meant to include other food products as well.

3 Claims, 6 Drawing Figures

3,852,507
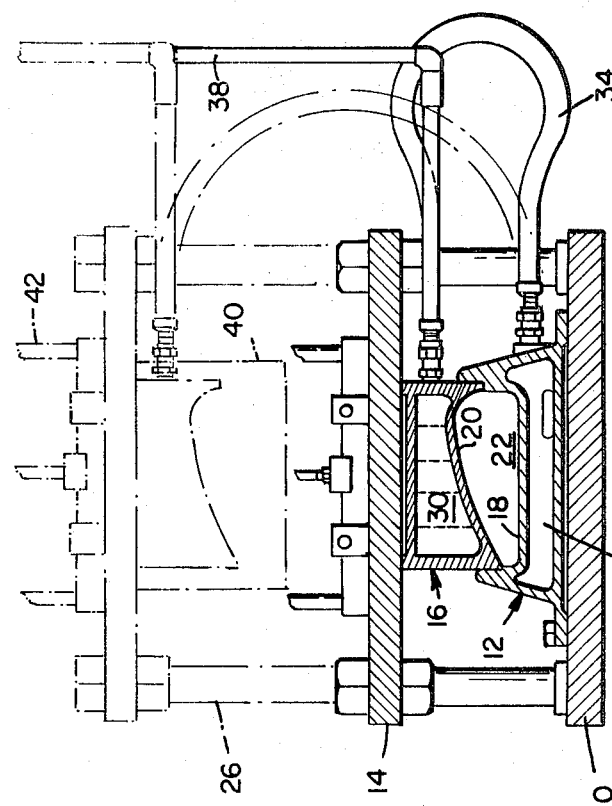
FIG_2
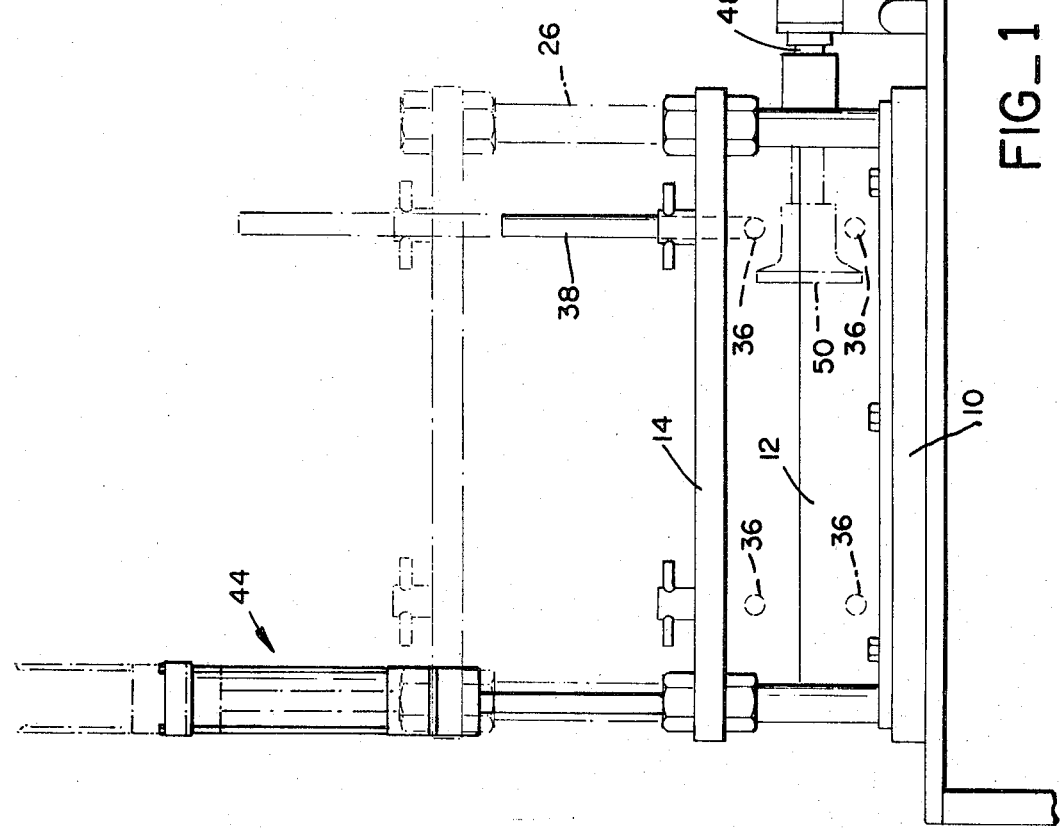
FIG_1

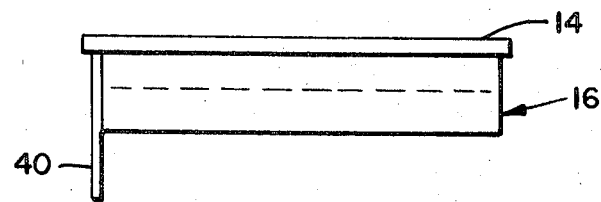
FIG_3
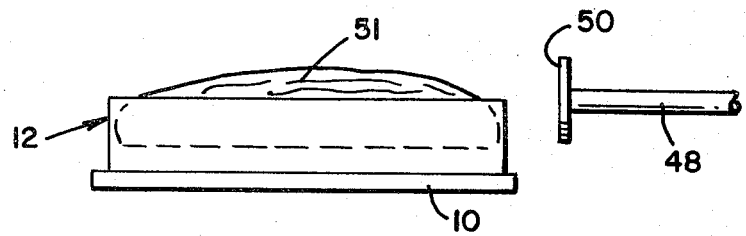
FIG_4
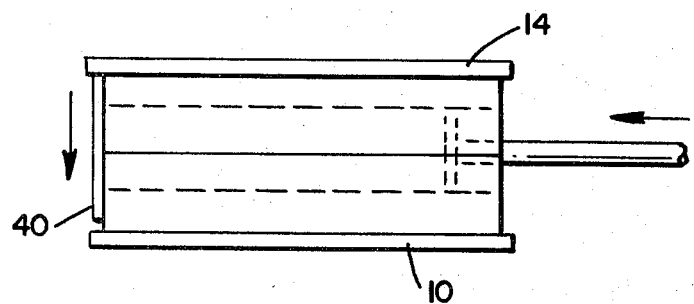
FIG_5
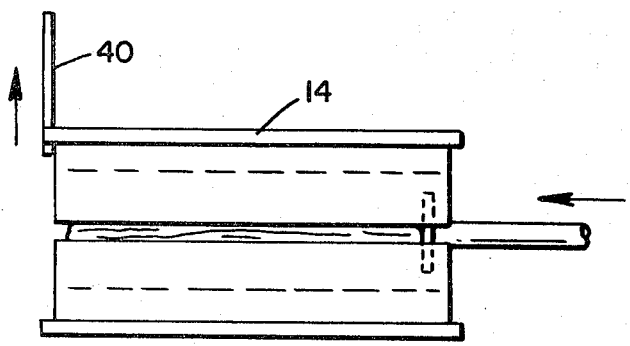
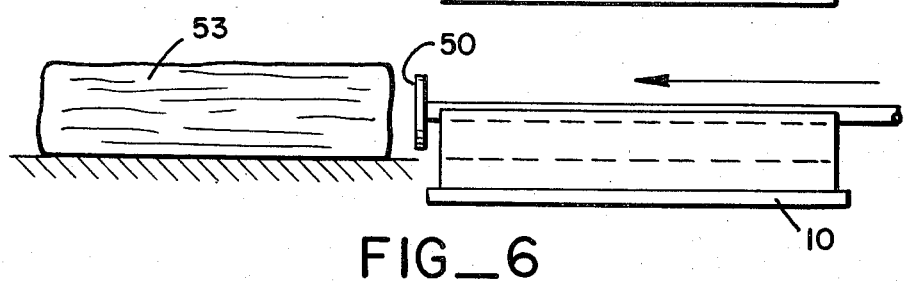
FIG_6

SURFACE FREEZING A SHAPED PIECE OF MEAT

BACKGROUND OF THE INVENTION

In many instances it is desirable to shape or form a solid irregular mass of bonded meat into an elongated piece of meat having a uniform cross-sectional shape. The thus formed piece may then be sliced to produce uniform and regular shaped meat portions. A typical example of the method and apparatus heretofore employed is disclosed in U.S. Pat. No. 2,565,245 entitled Method and Means for Shaping Meats. In this patent, the method employed consists of bringing the temperature of the irregular meat mass to about 30°F, i.e., just below the freezing point, prior to the forming of the meat between cooperating die members.

Coupled with the teachings of said patent, current practice does not utilize a mere lowering of room temperature meat to 30°F or less, since a slow lowering of meat temperature results in the formation of undesirable crystals. Accordingly, it is accepted procedure to quick freeze the meat to about 0°F and then temper or bring up the meat temperature to about 26°F before deforming the same in the dies. This procedure takes about 24 hours. This lengthy time required is costly, a break down of cellular structure results, and it is believed that conventional slicers perform better on fresh meat rather than frozen meat.

It is accordingly an object of the present invention to provide a method and apparatus as generally defined above in which fresh meat at generally holding room temperatures, i.e., above freezing, may be shaped or formed in die members, and caused to hold its desired cross-sectional shape during a subsequent slicing operation.

Another object of the invention is to provide a system as above described in which the meat piece is removed from the dies or mold in a surface frozen condition.

A further object of the invention is to provide a die or mold apparatus for forming the meat mass through which liquid nitrogen or other low temperature coolant or medium is circulated, resulting in a sub-freezing die surface in engagement with the meat placed thereon.

THE DRAWINGS

FIG. 1 is a side elevational view of the apparatus of the present invention;

FIG. 2 is an end elevational view of the apparatus shown in FIG. 1;

FIGS. 3, 4, 5 and 6 are diagrammatic representations of positions of the apparatus during selected intervals of the meat forming and surface freezing process of this invention.

DESCRIPTION OF THE PREFERRED EMBODIMENT

Before discussing the method of the present invention, reference will be first directed to the apparatus which is best illustrated in FIGS. 1 and 2 of the drawings. For reasons of simplicity and clarity, only such portions of the apparatus as are necessary for an understanding of the invention are shown, the non-disclosed portions being conventional and known to those skilled in the art. As shown, the apparatus includes a base plate 10 to which a lower die member 12 is secured and a movable upper plate 14 carrying an upper die member 16. All of these elements extend longitudinally, and in cross-section, the upper surface portion 18 of die 12 defines a general U-shaped open top channel, while the opposed lower surface portion 20 of die 16 defines an inverted channel. When the two dies are caused to come together, an elongated open ended chamber is provided having a cross-sectional configuration of the desired shape of the meat piece. As here illustrated, the shape is that of a sirloin steak.

The lower plate and die is stationery and mounted on any suitable base or frame 24, while the upper plate is mounted for vertical reciprocating movement on a plurality of guide rods 26. Any suitable conventional means may be utilized to effect a movement of the plate 14 and its associated die 16 from its upper inoperative open position shown in dash-dot lines to its lower operative closed position shown in solid lines.

As an important feature of the die apparatus, and with particular attention to FIG. 2 of the drawing, it will be noted that die members 12 and 16 are hollow having respective cavities 28 and 30 therein. The cavities are so arranged that the opposed or confronting surface portions 18 and 20 of the die members have a substantially uniform metal thickness. In this manner, when a coolant medium is introduced into the respective cavities the surfaces will be maintained at a relatively uniform temperature throughout their entire extent. Because of the fact that an extremely low temperature coolant such as liquid nitrogen is used, the dies are preferably made of a material such as cast white tombasil. Liquid nitrogen has a temperature of about −340°F and the resulting temperature at the surfaces of the dies will be about −100°F. While liquid nitrogen has been successfully used, other low temperature coolants such as carbon dioxide or the like might also be used.

The coolant is circulated through cavities 28 and 30 via a transfer hose 34 and suitable inlet and outlet ports 36 provided on the dies. An exhaust pipe 38 is also provided for the coolant.

As above mentioned, the chamber 22 which is defined by the two dies is open at its ends. To selectively open and close one end of said chamber, a gate 40 is provided. The gate may simply comprise a rectangular metal sheet carried on upper plate 14 and disposed in a plane normal to the longitudinal extent or axis of the die members. While the gate is mounted on plate and movable vertically in its own plane with movement of the plate, it is also mounted on the plate for independent movement in said plane. As shown, the gate 40 is vertically reciprocable on a pair of guide rods 42, with a hydraulic cylinder and piston assembly 44 mounted on plate 14 and actuatable to cause the gate to slide up and down. As will be understood, when the plate 14 is in its lower operative position as shown in solid lines and the gate is in its lower position extending below the plate, the gate will completely close the front end of die chamber 22.

At what might be termed the rear end of the chamber 22, a horizontally extending hydraulic cylinder 46 is provided having a piston 48 whose distal end carries a head 50 having a cross-sectional shape corresponding to that of chamber 22. By actuating the piston, the head or ram 50 may be moved from the rear end of the dies to the front end thereof for a purpose presently to be explained.

With the foregoing structural features in mind, reference may now be made to FIGS. 3 through 6 of the drawings for an explanation of how such apparatus is used in carrying out the process of my invention.

First, it will be understood that the die cavities 28 and 30 have a freezing coolant therein so that the surface temperature of the die portions 18 and 20 will be far below the freezing point of meat. Referring to FIG. 1, plate 14 and its attached upper die is in its upper position, gate 40 is down (but not overlying the front end of lower die member 12), and ram 50 is in its retracted position. With the parts in these positions, a mass 51 of bonded meat at room temperature is placed on the lower die 12. The length of the meat mass should be slightly less than the length of the die, while its cross-sectional shape should be suitable to that of the die in use.

At this time, and as shown in FIG. 4, plate 14 is lowered until the dies 12 and 16 contact each other and define chamber 22. At the same time, gate 40 moves down with the plate 14 to close the front end of the die chamber. Substantially simultaneously, piston 48 is actuated, causing ram 50 to enter chamber 22 to push the meat mass towards gate 40 and completely fill the mold chamber. The piston is operated at a predetermined pressure of approximately 500 p.s.i. which is sufficient to effect the desired flow characteristics of the meat mass within said chamber. The dies remain closed, the gate remains down, and the ram is held in its operative position for a period of time sufficient to cause the coldness of the confronting die surfaces to surface freeze the now deformed meat piece 53 to a depth of about one-eighth of an inch. With such surfaces having a temperature of about −100°F, the hold period will usually be approximately 30 seconds.

With the deformed piece 53 now surface frozen, the upper plate is moved upwardly about one-fourth inch and the gate 40 independently raised to open the front end of chamber 22. The ram is then actuated and fully extended to push the piece 53 out of the chamber, as illustrated in FIGS. 5 and 6. Thereafter, the plate 14 may be raised to its full upper or open position.

The reason for merely cracking the dies open rather than fully raising the upper die is due to the fact that meat piece 53 after being surface frozen may tend to adhere to one or both of the die members. If it stuck to the upper die 16 and the latter was fully raised, the meat piece would be raised to a position wherein the ram would not remove the piece. Therefore, until the ram ejects the meat from the die members, the upper die is only raised sufficiently to permit such ejection. After the plunger has been fully extended, the die 16 may be fully raised, the plunger retracted and the apparatus is in condition for receiving another mass of meat.

To facilitate removal of the meat piece, the die surfaces 18 and 22 are provided with a coating serving as a meat release agent. Typical of such a coating is a silicon glaze liner. However, even with such a liner or coating, the procedure above described is recommended.

I claim:

1. The method of forming an irregular mass of a meat into an elongated and at least partially frozen piece having a substantially uniform cross-sectional shape throughout the length of its elongation, which comprises the steps of: placing and supporting said irregular mass of meat on a longitudinally extending hollow lower die member, having an upwardly opening channel of uniform transverse cross-sectional configuration throughout its length corresponding to approximately one-half of the desired cross-sectional shape of said elongated piece to be produced; relatively moving a longitudinally extending hollow upper die member, having a downwardly opening channel of uniform transverse cross-sectional configuration throughout its length corresponding to approximately the other one-half of the desired cross-sectional shape of said elongated piece to be produced, into contact with said lower die member, and forming an elongated tubular chamber portion with opposite open ends and of uniform transverse cross-section throughout its length corresponding to the cross-sectional shape of said elongated piece to be produced with the mass of meat within said chamber; closing one of said ends of said chamber; forcing the head at the distal end of a piston, having a transverse cross-sectional configuration corresponding to the transverse cross-sectional configuration of said chamber, into the other of said ends and along said chamber toward said one end, and simultaneously forming said mass into said desired cross-sectional shape of said elongated piece; circulating refrigerant through said hollow dies to effect a cooling of said dies to substantially below the freezing temperature of said formed meat and freezing at least the surface of the formed meat in contact with said dies; and removing the elongated and at least partially frozen formed meat from said dies by first opening said one end of said chamber, and then further moving said head along the length of said chamber toward said one end to force said at least partially frozen elongated formed meat through said opened one end and from between the dies.

2. The method of claim 1, further including, prior to said step of removing, moving said upper die relatively transversely with respect to and out of contact with said lower die an amount such that the at least partially frozen formed meat will remain at least within the path of movement of said head during the subsequent step of removing.

3. The method of claim 1, wherein said step of freezing freezes said surface to a depth of about one-eighth of an inch.

* * * * *